United States Patent [19]
Narukami

[11] Patent Number: 5,794,092
[45] Date of Patent: Aug. 11, 1998

[54] METHOD FOR ADJUSTING THE GUIDE WIDTH FOR PHOTOSENSITIVE MATERIAL AND MECHANISM USED THEREFOR

[75] Inventor: Shinji Narukami, Wakayama, Japan

[73] Assignee: Noritsu Koki Co., Ltd., Wakayama, Japan

[21] Appl. No.: 810,943

[22] Filed: Feb. 27, 1997

[30] Foreign Application Priority Data

Mar. 1, 1996 [JP] Japan .................... 8-043936

[51] Int. Cl.⁶ .................................................. G03D 3/08
[52] U.S. Cl. ............................................ 396/615; 396/646
[58] Field of Search ........................... 396/615, 646, 396/567; 226/188, 189, 196; 355/27–29, 72, 75; 271/273

[56] References Cited

U.S. PATENT DOCUMENTS

| | | |
|---|---|---|
| 4,903,064 | 2/1990 | Kogane et al. .................. 396/615 |
| 5,134,430 | 7/1992 | Koizumi .......................... 396/615 |
| 5,475,465 | 12/1995 | Narukami ........................ 396/615 |

FOREIGN PATENT DOCUMENTS

7-133048  5/1995  Japan .

*Primary Examiner*—D. Rutledge
*Attorney, Agent, or Firm*—Smith Patent Office

[57] ABSTRACT

A method and a mechanism for setting a proper guide width corresponding to an actually used photosensitive material is disclosed. In adjusting a guide width L of a width guide installed in the conveyance course of photographic processing apparatus in order to guide the photosensitive material with respect to width direction, the width guide is initially adjusted so that the width L has an initial set point. This initial set point is wider than the width of the photosensitive material and, then, the width L of the width guide is narrowed until the width guide contacts the edges of the photosensitive material. Finally, the width L of the width guide is widened until a desired width is obtained.

15 Claims, 9 Drawing Sheets

METHOD FOR ADJUSTING THE GUIDE WIDTH FOR PHOTOSENSITIVE MATERIAL AND MECHANISM USED THEREFOR

BACKGROUND OF THE INVENTION

1. Field of the Invention

The present invention relates to a method and a mechanism for adjusting a width of a guide so that a photosensitive material can be properly guided with respect to a width direction thereof during conveyance of the photosensitive material in a photographic processing apparatus.

2. Discussion of the Related Art

In a processing apparatus for photosensitive material mentioned above, the photosensitive material must be conveyed through each processing section to carry out various processes such as exposure/printing, developing, cutting and so forth. In order to carry out each processing step properly, width guides to guide a conveyed photosensitive material must be provided and their width must be adjusted in accordance with a width of the conveyed photosensitive material. Heretofore, the width of a width guide for the photosensitive material has been adjusted to a maximum width specified by standards for the relevant photosensitive material. In the case of a photosensitive material having a nominal size of 127 mm whose width falls within a range of 126.66 mm±0.4 mm specified by JIS or ISO, the width of the width guide was adjusted to 127.5 mm, namely, 127 mm, the maximum standard width plus 0.5 mm for a gap.

The reference width determined based on a maximum standard width, however, leads to a large gap for the photosensitive material having a minimum standard width due to the deviation of widths in photosensitive materials. In the example mentioned above, the maximum gap is 1.3 mm because the minimum standard width is 126.2 mm. A large gap like this allows the photosensitive material to be conveyed in a zigzag pattern, consequently resulting in such deteriorated print qualities as a dispersion or slant of the edge width in a with-edge print and a dislocated print containing such additional information as the date and the like. Therefore, a proper gap must always be set for a photosensitive material of any width.

Japanese Patent Laid-Open Publication No. 133048 (corresponding to U.S. Pat. No. 5,475,465) discloses a width guide that can be set at plural guide positions for the same nominal size. It allows the width of a width guide to be set with a certain interval in accordance with the width of the actual photosensitive material even if it differs from its nominal size. The width of the photosensitive material depends on its manufacturers.

SUMMARY OF THE INVENTION

Though the conventional technology described above slightly relieved the problem caused by too large a gap, the improvement was not sufficient. Namely, in spite of plural guide positions enabled by conventional technology, a proper gap is not always secured because the real width of photosensitive material actually used is not adopted as a reference width for setting the gap. In an embodiment illustrated in FIG. 4 of the Laid-Open Publication, detecting holes 20 provided on a detecting board 18 determine a reference width.

It is an object of the present invention to provide a method and a mechanism for setting a proper guiding width depending on the real width of the photosensitive material actually used.

A method and a mechanism to adjust the width of a width guide for photosensitive material is disclosed by the present invention for achieving the above mentioned object. The width guide is adjusted to its initial set position so that its guide width is wider than the width of the photosensitive material. Then the width guide is narrowed so as to come into contact with the photosensitive material. The width guide is subsequently widened so as to have a desired width. Please note that any initial set position for the width guide is allowed so long as it provides a larger guide width than the width of a photosensitive material and, therefore, such an automatically-fixed position can be applied to an exclusive processor for photosensitive material of the same nominal size.

The above mentioned method theoretically provides a zero gap in the width when the contact takes place because of the fact that the width guide is narrowed so as to come into contact with the photosensitive material. Therefore, when the contact position is taken as a reference position and the width guide is widened starting from this contact position to give a desired width, the effect of width deviation of an actual photosensitive material can be eliminated. This procedure provides a proper gap for the width guide and thus deterioration in the quality of the prints can be prevented.

In adjusting the desired width, it is preferable that the width guide is widened so as to have a larger width than the desired guide width, after the photosensitive material is brought into contact with a photosensitive material, and then subsequently narrowed so as to have the desired width.

It is also acceptable that the width guide can be widened so as to have a desired width immediately after the photosensitive material is brought into contact with the width guide and this can end the adjustment of the width guide. This procedure, however, does not always secure a desired width due to probable backlash in the gears and screw shafts used to drive the width guide. Unless such backlash effects are negligible, it is preferable to take steps for adjusting the width guide so that it is widened to have a larger width than the desired width and then narrowed so as to have the desired width.

It is also preferable to introduce the photosensitive material into the width guide after finishing the initial setting. As a result, such a series of steps provides a width allowing the photosensitive material to be conveyed through the width guide without trouble such as having photosensitive material become stuck.

In addition to the features of the present invention described above, the number of the adjustable width guides provided in a conveyance course of the photosensitive material may be one or more. In case of plural width guides, the width guide adjustment may be applied to all or some of them and, further, the results of the adjustment of some designated width guides may be used to adjust other width guides. Thus, the time required to adjust all of the width guides can be reduced.

For example, after adjusting the width of the designated width guides to a desired width, a compensation value, namely, the difference between the final position of the designated width guide and its initial position, is calculated so that all other width guides can be adjusted in accordance with the compensation value.

Using such a compensation value allows all width guides to have the same width. Further, when these other width guides are adjusted to the desired width, they can be adjusted directly from an initial set position to the desired width position without performing the step where these width guides are narrowed until they contact the photosensitive material, thereby resulting in a reduction in the required adjusting time, as described above.

It is recommended that one of the width guides located in the vicinity of printing/exposure section, which is upstream in the conveyance course of the photosensitive material, is selected as the designated guide. This is because the width adjustment of the present invention is carried out after the photosensitive material is introduced into the width guides.

Regarding the designated guide, it is recommended to use one guide situated at a place where the photosensitive material conveyance course is curved, because the designated width guide is narrowed so as to contact the photosensitive material. By bringing the width guide into contact with the photosensitive material it causes a force to deform the photosensitive material. Thus it is preferable to select a width guide situated in a place where a probable deformation caused by this force is less likely to take place.

In the above description, the width of the photosensitive material is measured by the width guide. It can also be measured by the use of one of a variety of sensors such as a width sensor which can not guide the photosensitive material, and then the compensating value can be calculated for adjusting the width of the width guides.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which.

DETAILED DESCRIPTION OF THE PREFERRED EMBODIMENTS

The first preferred embodiment of the present invention will now be described with reference to the drawings.

Figure 1:
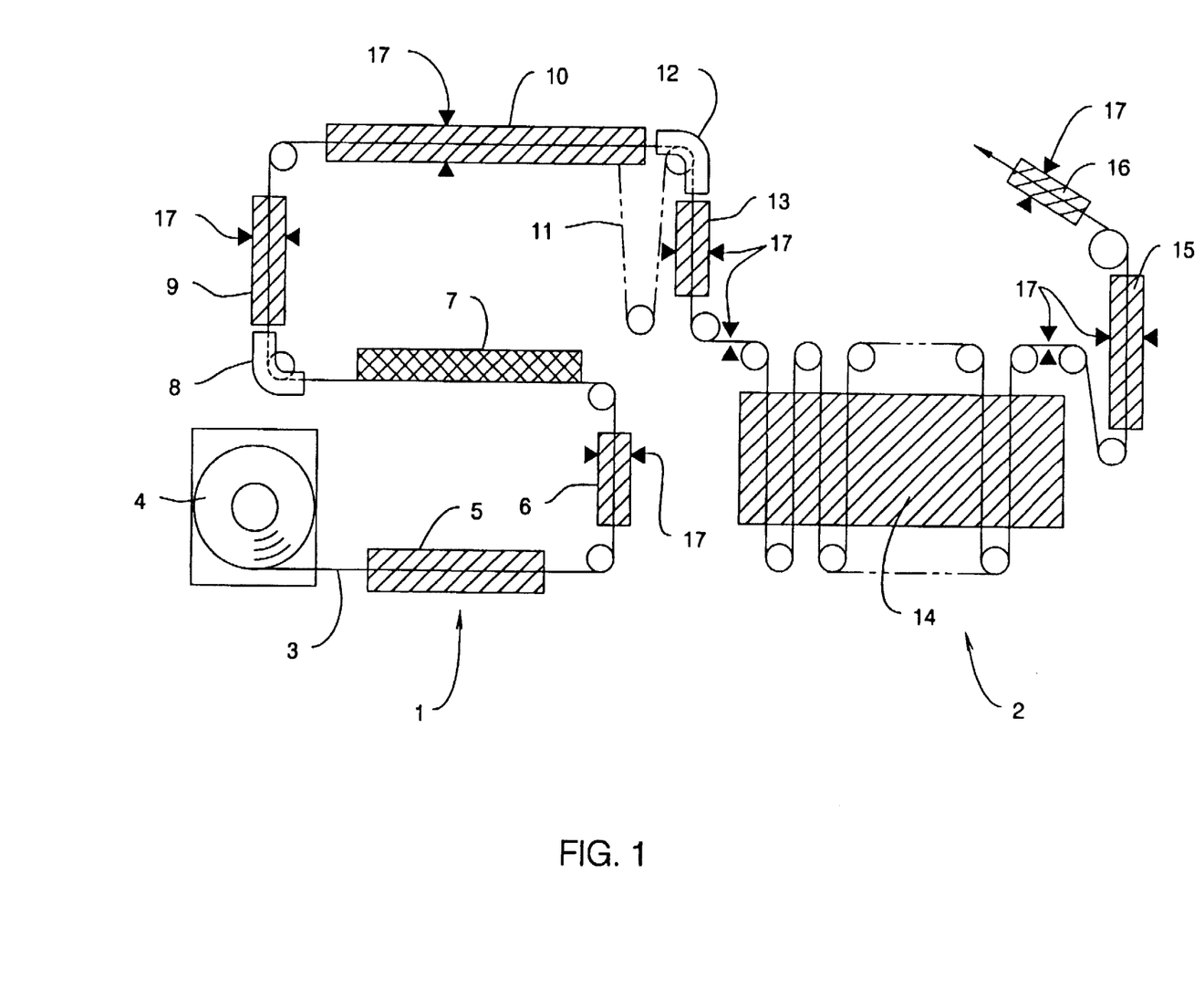
FIG. 1 is a schematic representation of a photographic processing apparatus.

FIG. 1 is a schematic representation of a photographic processing apparatus using a width adjusting method of the present invention. The photographic processing apparatus comprises a printing section 1 for subjecting a photographic printing paper 3 (hereinafter referred to as "printing paper"), an example of a photosensitive material, to an exposure and a processing section 2 for treating and developing the exposed printing paper 3.

The printing section 1 includes a supplying section 5 to supply the printing paper 3 along a conveyance course. The printing paper 3 is pulled out of a printing paper magazine 4. The printing section 1 also includes a loading section 6 to convey the printing paper 3; an exposing/printing section 7 to carry out the exposing and printing of a photographic image of the negative film (not shown) onto the printing paper 3; an advancing part 8 to convey the printing paper 3 precisely in a constant length; a character printing section 9 to print the date, frame number, etc.; a printing paper conveying section 10 capable of forming a loop 11 for adjusting the progress of the printing paper 3 to be conveyed to the processing part 2; a forwarding part 12 to send out the printing paper 3 to the processing part 2; and an outlet section 13.

The processing part 2 includes a processing tank 14 for applying such treatments as color development, fixing, etc. to the printing paper 3; a drying section 15 to dry the printing paper 3 after treatment; and a cutter section 16 to cut the printing paper 3.

Along the conveyance courses of the printing section 1 and the processing section 2, plural width guides 17 are provided to guide the printing paper 3 in its width direction. For the convenience of illustration, the locations of width guides 17 are represented by triangular symbols.

Figure 2:
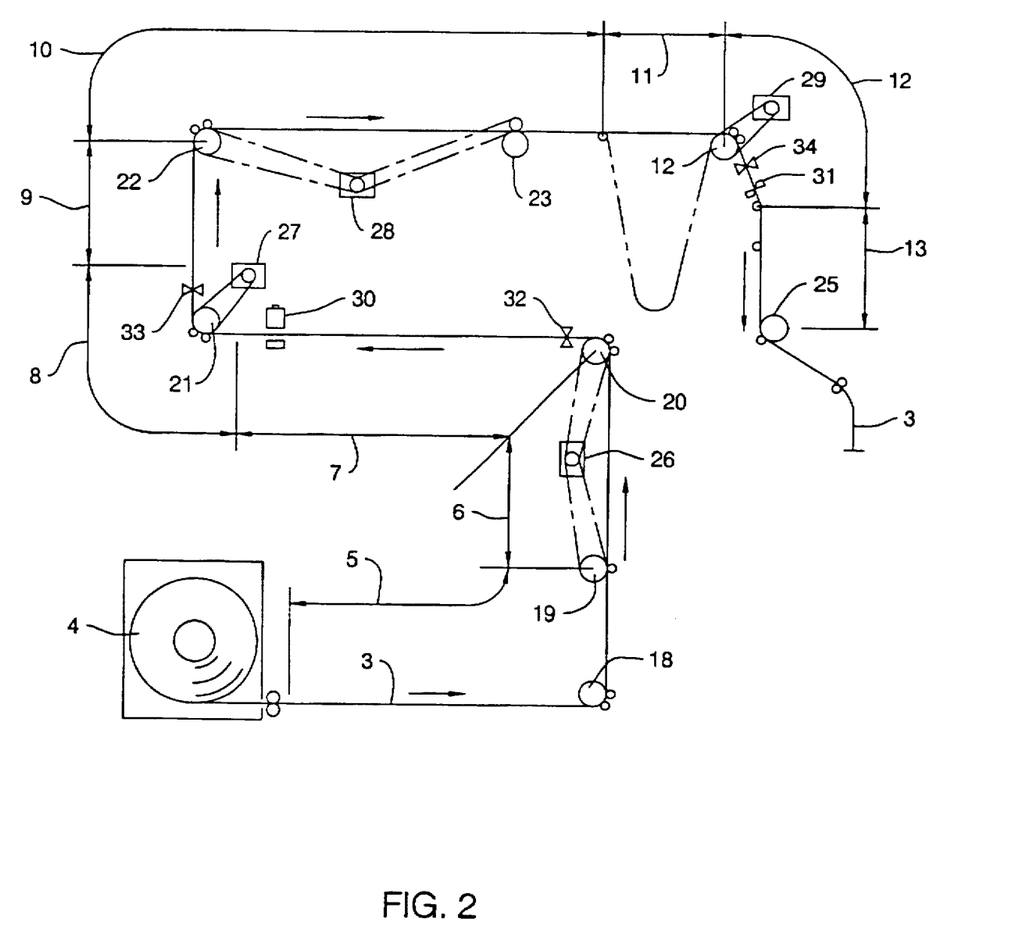
FIG. 2 is a schematic representation of a printing part of the photographic processing apparatus.

FIG. 2 shows the details of the printing section 1. A plurality of rollers 18, 19, 20, 21, 22, 23, 24 and 25 are provided at respective locations to convey the printing paper 3. The rollers 19, 20 located in the loading section 6 are driven by a motor 26. The roller 21 in the advancing part 8 is driven by a motor 27. The rollers 22, 23 are driven by a motor 28. The roller 24 in the forwarding part 12 is driven by a motor 29. In the exposing/printing section 7 where the photographic image on a negative film is exposed and printed on the printing paper 3, a punch 30 is provided to punch the printing paper 3. On the conveyance course, just slightly downstream from the roller 20 in the exposing/printing section 7, a sensor 32 is provided to detect the front edges of the conveyed printing paper 3. A similar sensor 33 is provided in the advancing part 8.

In the forwarding part 12, a cutter 31 is provided for cutting the printing paper 3 into pieces of proper lengths to prevent too long of a strip of printing paper 3 from being pulled out of the printing paper magazine 4 and conveyed through the apparatus thereby causing trouble. Cutting the printing paper 3 with the cutter 31 must be carried out carefully so as not to damage the printed pictures. In order to control this cutting line, a sensor 34 is provided to detect the hole punched in the exposing/printing part 7, and the cutting procedure is carried out with reference to this punched hole.

Figure 3:
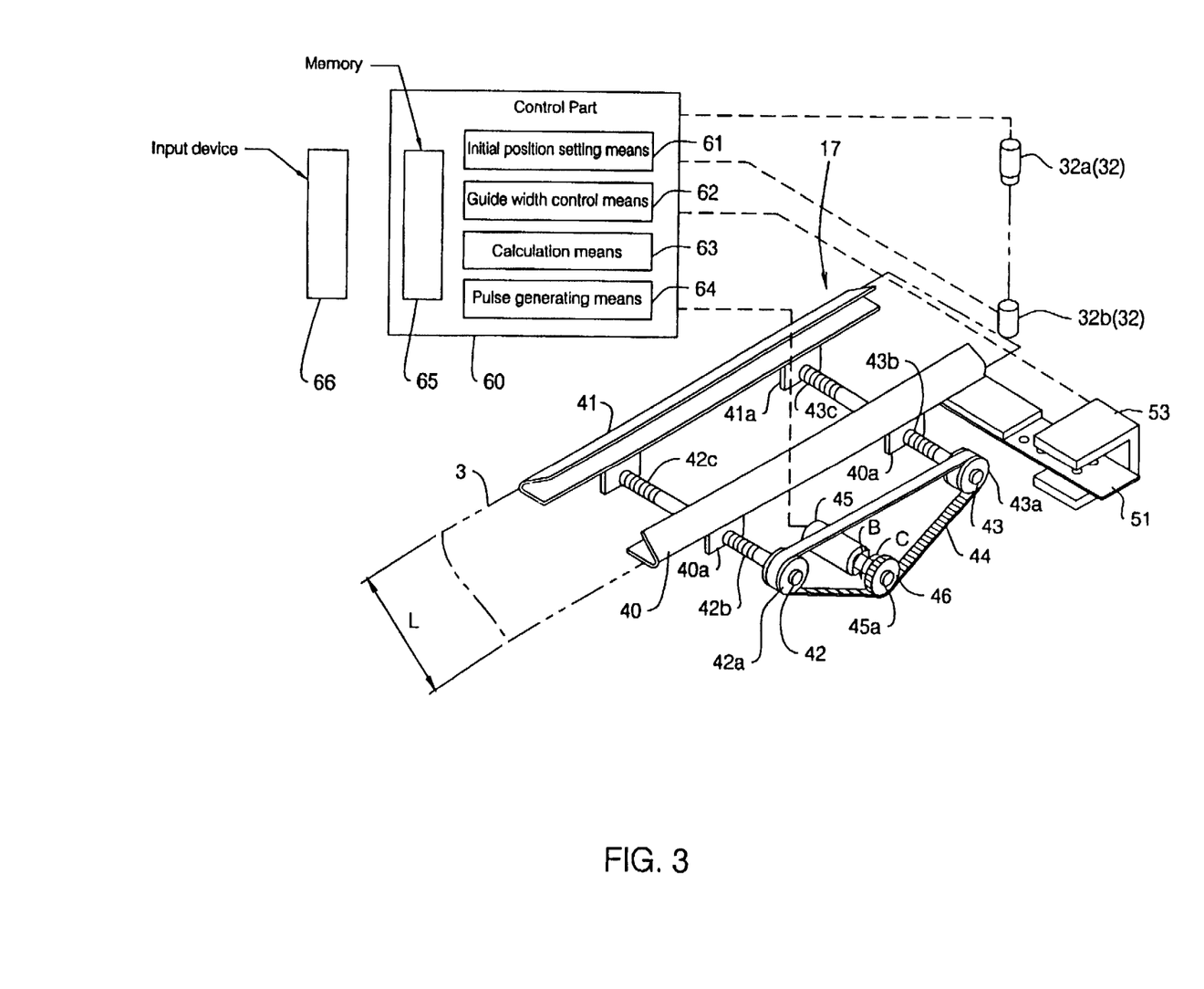
FIG. 3 is a perspective view of a guide adjusting mechanism according to the present invention.

FIG. 3 shows a detailed construction of a width guide 17 provided in the loading part 6. Each width guide 17 represented at various locations in FIG. 1, has a construction that is basically the same as the one shown in FIG. 3. In FIG. 3, the printing paper 3 is conveyed in the direction indicated by arrow A.

The width guide 17 comprises a pair of guide members, namely, a first guide member 40 and a second guide member 41, whose width-guiding portion is approximately formed in a V-shape. The first guide member 40 is provided with a pair of female screws 40a mating with a pair of screw shafts 42, 43. Similarly, the second guide member 41 is provided with a pair of female screws 41a. The screw shafts 42, 43 are disposed below the conveyance course of the paper 3. The screw shaft 42 is provided with a head 42a, a right-hand thread portion 42b and a left-hand thread portion 42c. Similarly, the screw shaft 43 is provided with a head 43a, a right-hand thread portion 43b and a left-hand thread portion 43c. The first and the second guide members 40, 41 are driven by a pulse motor 45 through a driving roller 46 installed at the end of a drive shaft 45a. A belt 44 is provided to wind along a triangular course formed by the driving roller 46, the head 42a of the screw shaft 42, and the head 43a of the screw shaft 43. Between the driving roller 46 and the pulse motor 45, is provided a torque limiter (not shown) which does not allow the drive toque to be transmitted from the pulse motor 45 to the screw shafts 42, 43 in case the loading torque applied to the driving roller 46 exceeds a specified level.

As illustrated in FIG. 3, when the drive roller 46 rotates in the direction specified by arrow B, the first and second guide members 40, 41 are moved so as to go away from each other; namely, the width guide 17 is widened. In other words, the illustrated distance L becomes longer. Conversely, when the driving roller 46 rotates in the direction specified by arrow C, the first and second guide members 40, 41 are moved so as to become nearer to each other; namely, the width guide 17 is narrowed. In other words, the illustrated distance L becomes shorter.

Figure 4:
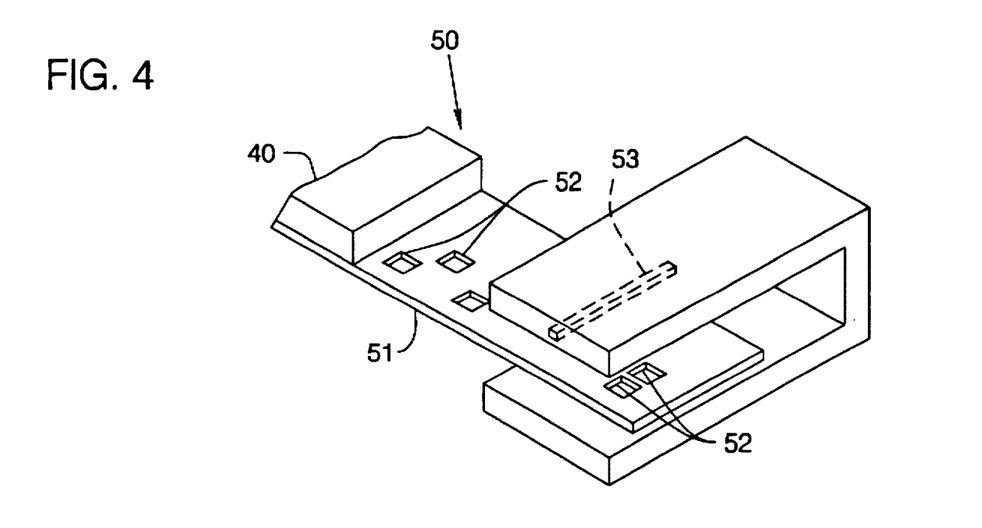
FIG. 4 is a perspective view of an initial position setting part.
Figure 5:
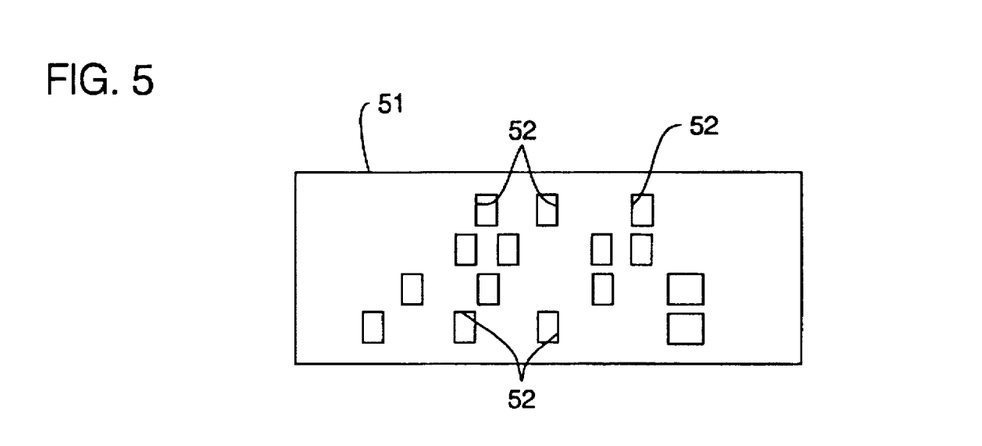
FIG. 5 is an enlarged plan view of a detection board shown in FIG. 4.

Referring to FIGS. 3–5, an initial position setting part 50 will be described. The construction of the initial position setting part 50 and the structure of a detecting part is disclosed in U.S. Pat. No. 5,475,465 and this discussion is incorporated herein by reference.

The detecting board 51 is connected to the first guide member 40. As illustrated in FIG. 5, several detecting holes 52 are formed on the detecting board 51. A position sensor 53 is provided so as to allow the detecting board 51 to pass between two portions of the board to detect the detecting holes 52 formed on the detecting board 51. The position sensor 53 is an optical sensor comprising a light projector and a light receptor respectively formed in a line. A shift of the detecting board 51 caused by movement of the width guide 17 brings a change in the arrangement of detecting holes 52 relative to the position sensor 53, and an output signal from position sensor 53 also changes corresponding to the change of this relative arrangement. The position of the width guide 17 can be detected from this output signal.

In FIG. 3, a sensor 32 is located downstream of the first and second guide members in the conveyance course. The sensor 32 comprises a light projector 32a and a light receptor 32b to detect the conveyed printing paper 3. Though FIG. 2 shows that there is a curve in the conveyance course between the loading section 6 and the sensor 32, FIG. 3 does not show such a curve for the sake of this illustration.

A control part 60 in FIG. 3 is provided to control the width guides 17 and the like. The control part 60 comprises an initial position setting means 61 to set the initial position of the width guide before adjusting the width guides; a guide width control means 62 to control width guides 17 so that they have a desired width; a calculation means 63 to calculate the drive amounts for the screw shafts 42, 43; a pulse generating means 64 to drive the pulse motor 45; and a memory 65 having various data including the standard widths of print papers 3 for each film manufacturer.

The control part 60 receives output signals from position sensor 53 and sensor 32 previously mentioned.

The control part 60 is also connected to an input device 66 comprising a keyboard and the like.

Referring to FIGS. 3 and 6–8, an adjusting method for the width guide 17 will now be described. Specific reference will be made to the width guide 17 provided at the loading section 6.

Figure 6:
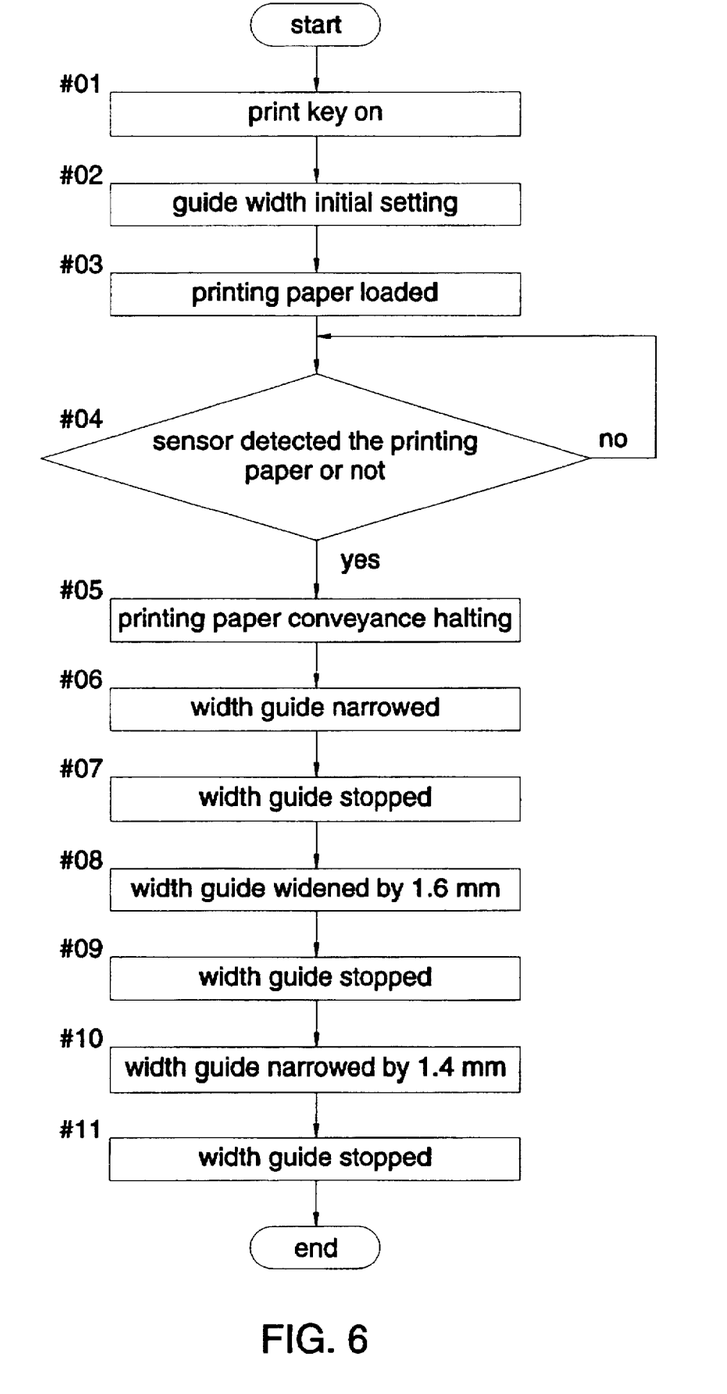
FIG. 6 is a flow chart of a guide adjusting procedure according to a first embodiment of the present invention.

As shown in FIG. 6, a print key is turned on in step #01. The print key is provided on the input device 66. Next, the initial value of the width of the width guide 17 is set in step #02. The initial value of width L1 is determined according to the standard width of the conveyed printing paper 3. The aim of setting the initial value is to allow the incoming printing paper 3 to pass through the width guide 17 smoothly.

Regarding setting the initial value of the width, if a width guide 17 is installed in such a location as the supporting section 5, where the width guide can be installed horizontally near the print paper magazine 4, the printing paper 3 can be conveyed without being supported by the width guide 17. Therefore, the width guide 17 may simply be widened to its maximum width as an initial set value, regardless of the width of the conveyed printing paper 3.

Figure 7A:
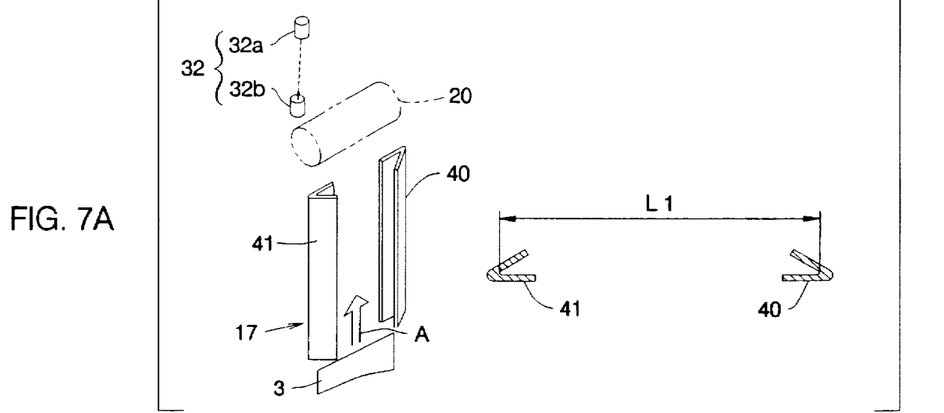
FIGS. 7A, 7B and 7C show side by side perspective and top views of how a guide operates to hold the photosensitive material.

If the printing paper 3 is of a 127 mm nominal size by a certain manufacturer and has a standard width range of 126.6 mm±0.4 mm, then its maximum and minimum widths are 127 mm and 126.2 mm respectively. The initial value of the width of the width guide 17 may be set, for example, to 127.5 mm, namely, a width that is 0.5 mm larger than the standard maximum width. For setting the initial position of the width guide, the pulse motor 45 shifts the first and second guide members 40, 41. The detecting board 51 moves as the first guide member 40 moves and the position sensor 53 also changes its output signal. When a detecting hole 52 on the detecting board 51 corresponding to the initial position of the width guide is detected, the pulse motor 45 stops and thus the width of the width guide 17 is completely set to an initial position such as is shown in FIG. 7A.

Figure 7B:
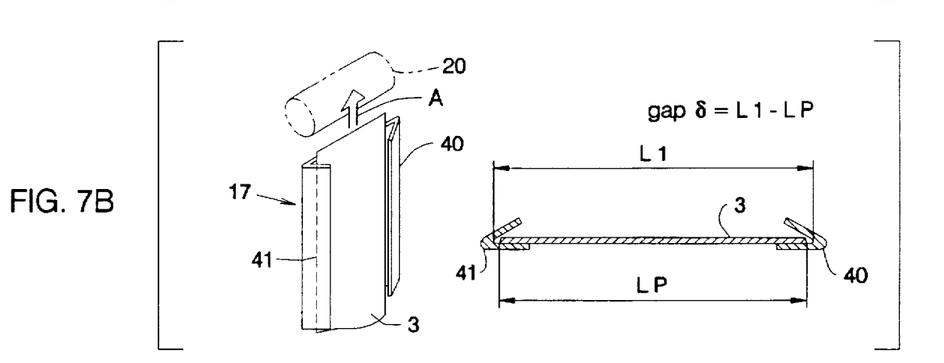
Figure 7C:
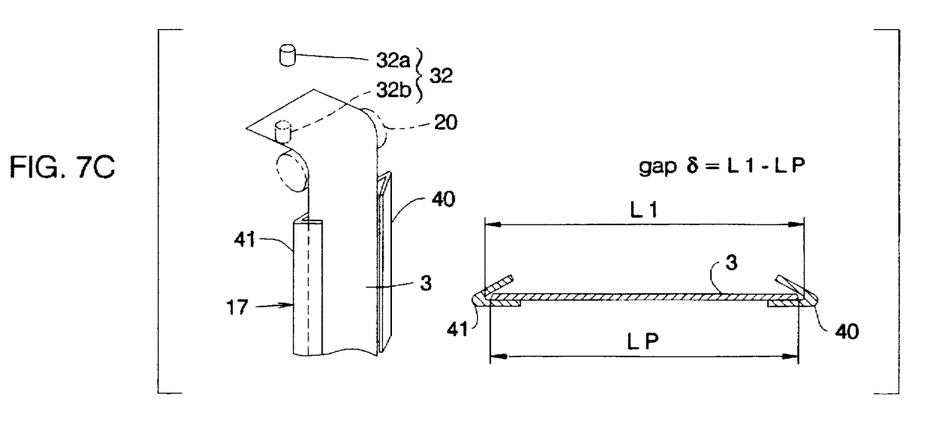

Next, the printing paper 3 is pulled out of the magazine 4 and conveyed along the conveyance course (step #03). As shown in FIG. 7B, the printing paper 3 passes through the width guide 17 in the initial position in loading section 6. The initial width L1 of the width guide 17 is larger than the standard maximum width so that the printing paper 3 can smoothly pass through the width guide 17 without getting stuck. Then the gap between the printing paper 3 and the width guide 17 is represented as follows:

gap δ=L1−LP ; where LP is the width of the conveyed printing paper 3.

When the conveyed printing paper 3 has the maximum width (127 mm) of the standard paper, gap δ=127.5−127=0.5 mm When the conveyed printing paper 3 has the minimum width (126.2 mm) of the standard paper, gap δ=127.5−126.2=1.3 mm The sensor 32 installed in the vicinity of the exposing section 7 watches for the front edge of the conveyed printing paper 3 (step #04). When the sensor 32 detects the front edge of the printing paper 3, the conveyance of printing paper 3 comes to a stop (see FIG. 7C and step #05).

Figure 8A:
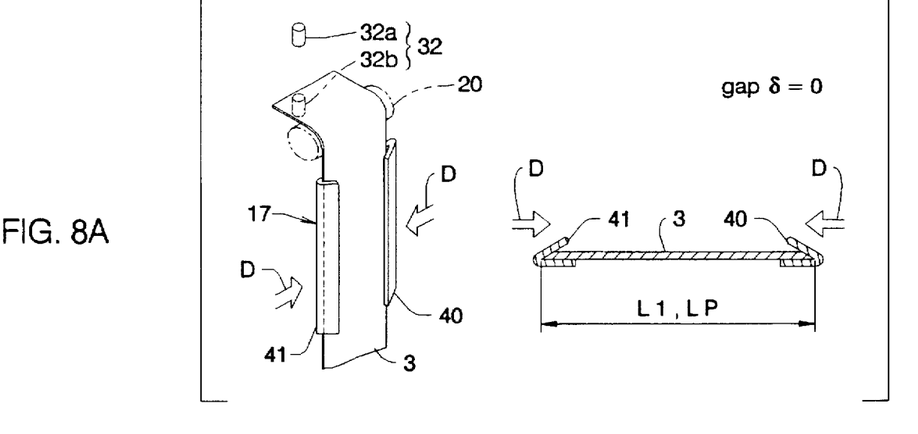
FIGS. 8A and 8B show side by side perspective and top views of how a guide operates to hold the photosensitive material.

Then the width guide 17 is narrowed by moving the guides 40, 41 in the direction shown by the arrows D in FIG. 8A. The traveling distance of the width guide 17 is set in terms of the gap to that equivalent to about 2 mm (step #06). This setting value of 2 mm is determined with any backlash in the transmission system from the pulse motor 45 to the guide members 40, 41 taken into account. Furthermore, the setting value is also determined so that the printing paper 3 and the width guide 17 always contact each other while the width guide 17 is narrowing. The traveling distance of width guide 17 is controlled by the number of pulses supplied to the pulse motor 45.

During the time when the width guide 17 is narrowing its width by 2 mm, it always comes into contact with the edges of the printing paper 3 in the closing process. At the moment when the width guide 17 contacts the edges of the printing paper 3, the width guide 17 stops due to a torque limiter effect, in spite of the width guide 17 trying to be further narrowed (step #07). At this moment, the gap is equal to 0 because the guide width L1 is equal to the width LP of the printing paper 3.

Figure 8B:
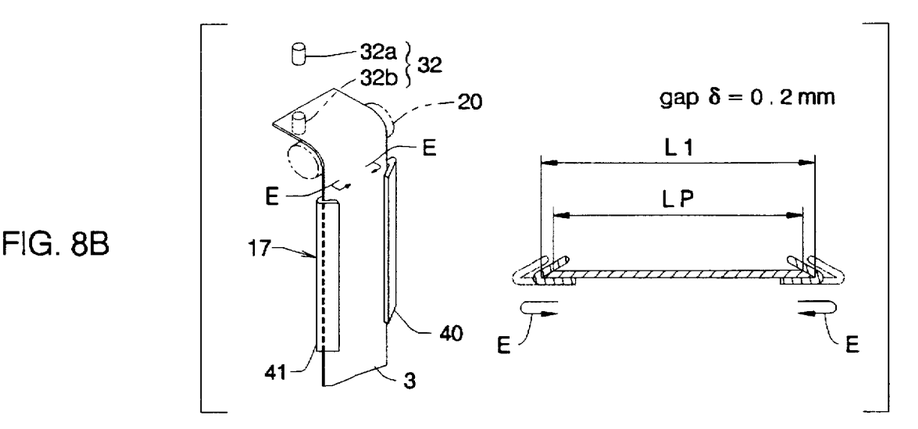

Next, the width guide 17 is driven to widen its width by 1.6 mm (step #08). After completing the widening, the width guide 17 is brought to a halt (step #09), and then the width guide 17 is narrowed by 1.4 mm (step #10)(see arrows E in FIG. 8(e)). After completing the narrowing process, the width guide 17 is forced to stop (step #11). Then the adjustment of width guide 17 is completely finished. This means that the width of the width guide 17 has been set to the desired width. In this completely adjusted condition, the gap is set to a value expressed by the formula below:

gap δ=1.6 mm−1.4 mm=0.2 mm

Regardless of the actual width of the printing paper 3, the gap is set to this value.

In the process of setting the gap to 0.2 mm, the width guide 17 is once widened by 1.6 mm and then narrowed by 1.4 mm. This process allows the system to eliminate the effect of most of the backlashes in the transmission system. Of course, if backlashes are not expected, steps #10 and #11 can be omitted by widening the width guide 17 by 0.2 mm at step #8. The control to widen the width guide 17 by 0.2 mm may also be allowed with backlash taken into account.

As described above, the adjustment of the width guide 17 at the loading section 6 is completed. Next the conveyance of the printing paper 3 is restarted. The width guide 17 in the character printing section 9 is adjusted in the same procedure as mentioned above. In this case, it is recommended that the printing paper 3 be conveyed with the pressing force of the roller 21, located downstream of the exposing section 7 in the conveyance course, either entirely or partially released. Other width guides 17 installed in the respective locations are similarly adjusted.

During the adjustment mentioned above, the printing paper 3 simply passes through the exposing/printing section 7 with no exposing/printing treatment for the printing paper 3 being carried out. After completing the adjustment of all relevant width guides 17, the printing paper 3 is rewound back to a specified position, and then loading of the printing paper 3 is started again and the treatments including exposure, printing and the like are carried out at each section.

Figure 9:
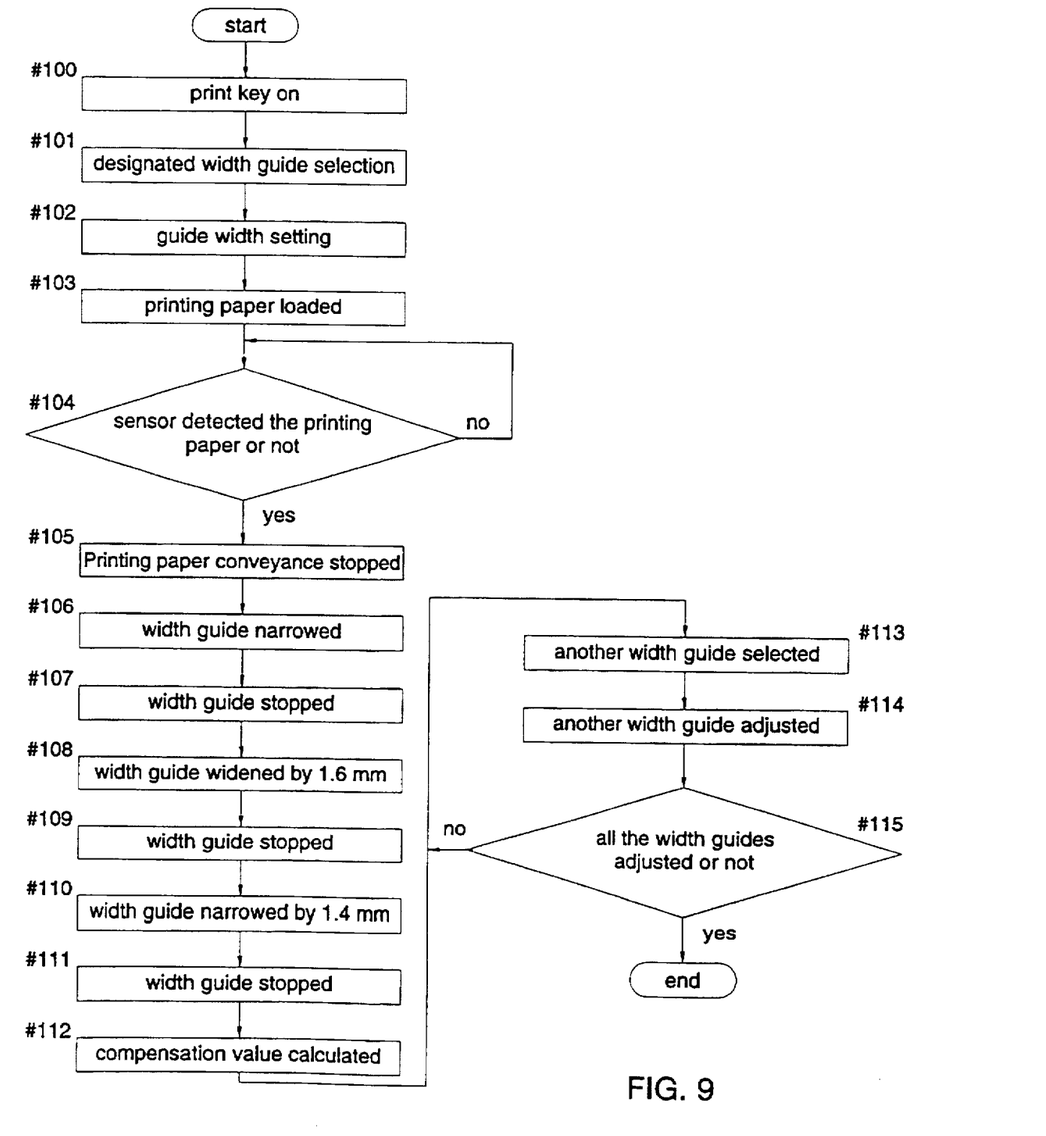
FIG. 9 is a flow chart of a guide adjusting procedure according to a second embodiment of the present invention.

The second embodiment of the present invention will now be described mainly with reference to FIG. 9. Only the different steps from those in FIG. 6 will be described.

First, after turning on a print key (step #100), one of the width guides 17 is selected as a "designated" width guide 17 (step #101). As for the designated width guide 17 which is selected among a plurality of width guides 17 shown in FIG. 1, a preferable guide is located in the loading section 6 located upstream in the conveyance course for the printing paper 3. This preferable width guide 17 is usually installed in the vicinity of the exposing/printing section 7.

After the designated width guide 17 is selected, the designated width guide 17 is subjected to adjustment (step #102–step #111). This adjustment is carried out in the same way as described before. After the adjustment of the designated width guide 17 is completed, the position difference between the initial position at the step #102 and the final position at the step #111 following completion of the guide width adjustment is calculated as the compensation value (step #112). This compensation value is then calculated as a number of pulses to be transferred to the pulse motor 45 to drive it. Such a calculation is based on the concept that the shift amount of the first and second guide members 40, 41 is proportional to the number of pulses to drive the motor 45.

After calculating the compensation value, another width guide 17 which is not adjusted yet is selected (step #113). According to the compensation value, the newly-selected width guide 17 is adjusted (step #114). Namely, the newly-selected width guide 17 is set firstly to its initial position, and then a pulse number corresponding to the compensation value is supplied to the pulse motor 45. Therefore, the newly-selected width guide 17 is immediately moved from the initial position to the position where a desired guide width is realized. Thus, the newly-selected second width guide 17 is completely adjusted.

A test is made to determine whether all of the width guides 17 have already been adjusted or not (step #114). When there is another width guide 17 that has not been adjusted, step #113 is resumed to carry out an adjustment of the next width guide 17. When the test determines that all adjustments have taken place for all the width guides 17, the expected treatments to the printing paper 3 are then carried out.

Adjustment of other width guides 17, except for the first width guide, may be carried out at the same time.

In the second embodiment, the printing paper 3 is rewound back to a specified position after the designated width guide 17 is completely adjusted. Reloading the printing paper 3 is carried out after all of the width guides 17 are completely adjusted.

Figure 10:
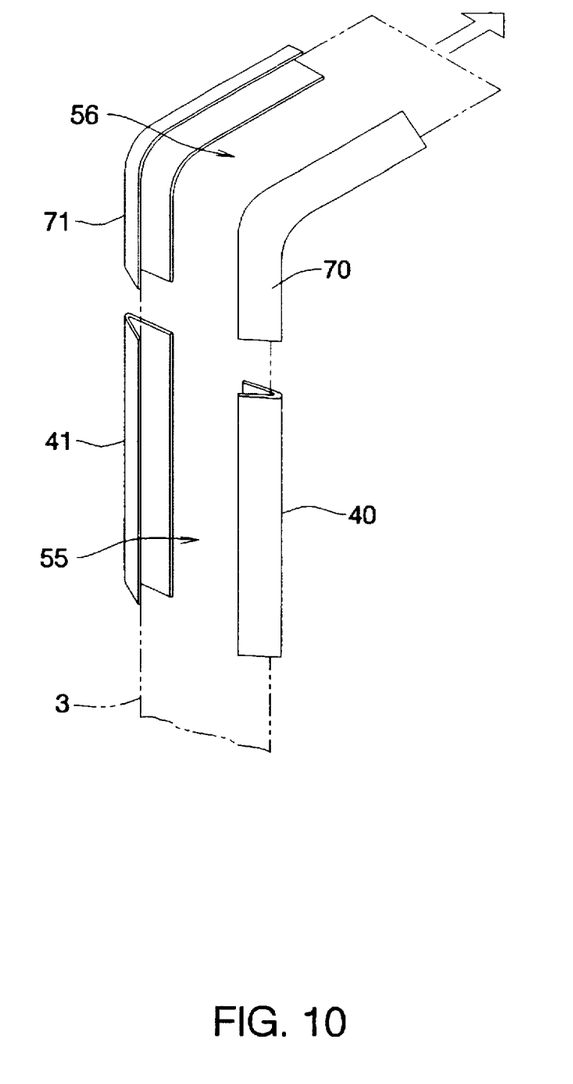
FIG. 10 is a perspective view of a guide in accordance with the second embodiment of the present invention.

FIG. 10 shows another embodiment of width guide 17. The width guide 17 of FIG. 10 differs from those of FIG. 3 or FIG. 7 in that a width guide 17 is installed in a curved portion 56 as well as in a flat portion 55 on the conveyance course. In the flat portion 55, first and second guide members 40, 41 are provided in the same manner as in FIG. 3, and third and fourth guide members 70, 71 are provided at the curved portion 56. In narrowing the width guide 17 so as to come into contact with the printing paper 3, too large a force may cause deformation of the printing paper 3 resulting in a probable failure in setting a proper gap. Therefore, it is recommended that the initial adjustment of the width of the width guide 17 be carried out at a location where the printing paper 3 is not likely to deform, i.e., where high rigidity of the printing paper 3 is expected. As for the designated width guide 17 described in the second embodiment, it is preferable to use one such as in the curved portion 56 as shown. It is also preferable that the designated width guide 17 has the curved portion with a maximum curvature like that located in curved portion 56.

In FIG. 10, the pair of guide members 40, 41 and the pair of guide members 70, 71 are independently driven by their exclusive motors respectively. Alternative constructions may be acceptable, such as where the first guide member 40 and the third guide member 70 are integrated as a unit as well as the second guide member 41 and the fourth guide member 71 integrated as another unit. These two units may then be driven by a single motor.

Further description of other embodiments will be shown as follows:

Though the embodiments above relate to the printing paper 3, the invention is applicable to other photosensitive materials to be guided therethrough including a negative film, a positive film and the like.

In the embodiment shown in FIG. 8, another procedure may be acceptable. Initially all of the plural width guides 17 may be completely set to their initial positions and then a designated width guide 17 is selected and adjusted, and finally, the other width guides 17 are adjusted according to a compensation value.

In the embodiments mentioned above, a width guide 17 is narrowed by 2 mm after being set to its initial position, but this traveling distance may not be defined. For example, when a pulse generating encoder is installed on the axis of a pulse motor and the pulse is monitored as to whether it is generated or not, the gap between a width guide and a photosensitive material may be regarded as zero when no pulse is detected for a certain period due to the operation of a torque limiter.

As a designated width guide 17 in the embodiments mentioned above, the one selected was the one installed in the vicinity of the exposing/printing section 7, but other width guides 17 installed in the vicinity of the character printing section 9 or the printing paper conveying section 10 may be selected freely for the embodiments mentioned above.

Further, the standards stated above are not restricted to JIS and ISO, but also include those specified by various photosensitive material manufacturers.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A guide width adjusting method for a width guide provided along a photosensitive material conveyance course to guide a width of a photosensitive material, comprising the steps of:

setting the width guide to an initial position predetermined with respect to the width of the photosensitive material;

measuring an actual width of the conveyed photosensitive material;

determining a desired width of the width guide based on the width measured in said step of measuring; and moving the width guide in a width direction so as to be adjusted to the desired width determined in said step of determining.

2. A guide width adjusting method as defined in claim 1, further comprising the steps of:

calculating a compensation value for the width guide according to the desired width and a width in the initial position; and then performing said step of moving.

3. A guide width adjusting method as defined in claim 1, wherein said step of moving includes:

widening the width guide to have a width wider than the desired width, and then narrowing the width guide until the width guide reaches the desired width.

4. A guide width adjusting method for a width guide provided along a photosensitive material conveyance course to guide a width of a photosensitive material, comprising the steps of:

setting the width guide to an initial position so that a width of the width guide is wider than the width of the photosensitive material;

narrowing the width guide until the width guide contacts the photosensitive material; and widening the width guide until the width of the width guide reaches a desired width.

5. A guide width adjusting method as defined in claim 4, further comprising the steps of:

calculating a compensation value for the width guide according to the desired width and the width in the initial position; and then performing said step of widening.

6. A guide width adjusting method as defined in claim 4, further comprising the step of:

introducing the photosensitive material into the width guide after the width guide is set to the initial position.

7. A guide width adjusting method for a width guide provided along a photosensitive material conveyance course to guide a width of a photosensitive material, comprising the steps of:

selecting a designated width guide from a plurality of width guides;

setting the designated width guide to an initial position that is wider than the width of the photosensitive material;

narrowing the designated width guide until the designated width guide contacts the photosensitive material; and widening the designated width guide until the width of the designated width guide reaches a desired width.

8. A guide width adjusting method as defined in claim 7, wherein said step of selecting includes:

selecting a width guide disposed in a vicinity of an exposing/printing section of a photographic processing apparatus.

9. A guide width adjusting method as defined in claim 7, further comprising the steps of:

calculating a compensation value from the designated width guide after the designated width guide is completely adjusted to the desired width, the compensation value is calculated from a position difference of the designated width guide between the initial position and a final position, and then adjusting other width guides to have the desired width according to the compensation value.

10. A guide width adjusting method as defined in claim 8, further comprising the steps of:

calculating a compensation value from the designated width guide after the designated width guide is completely adjusted to the desired width, the compensation value is calculated from a position difference of the designated width guide between the initial position and a final position, and then adjusting other width guides to have the desired width according to the compensation value.

11. A guide width adjusting method as defined in claim 7, further comprising the step of:

providing the width guide at a curved portion in the conveyance course.

12. A guide width adjusting mechanism provided along a photosensitive material conveyance course to guide a width of a photosensitive material, comprising:

driving means connected to a width guide for changing a width of said width guide; and guide width control means for moving said width guide to an initial position having a wider width than the width of the photosensitive material, and then for narrowing said width guide until said width guide contacts the photosensitive material, and then for widening said width guide until the width of said width guide reaches to a desired width.

13. A guide width adjusting mechanism as defined in claim 12, further comprising:

calculation means for calculating a compensation value from a position difference of said width guide between the initial position and a final position of said guide width.

14. A width guide mechanism as defined in claim 11, wherein said width guide is provided at a curved portion in said conveyance course.

15. A width guide mechanism as defined in claim 13, wherein said width guide is provided at a curved portion in said conveyance course.

* * * * *